United States Patent [19]

Hinkel, Jr.

[11] Patent Number: 5,261,842
[45] Date of Patent: Nov. 16, 1993

[54] OUTBOARD MOTOR RETROFIT GENERATOR APPARATUS

[76] Inventor: Carl L. Hinkel, Jr., R.D. 1, Box 662, Lenhartsville, Pa. 19534

[21] Appl. No.: 9,057
[22] Filed: Jan. 26, 1993
[51] Int. Cl.⁵ .............................................. H02K 5/22
[52] U.S. Cl. ............................................ 440/3; 322/1; 440/6; 440/78; 440/113
[58] Field of Search ............... 440/3, 6, 78, 113, 900; 322/1

[56] References Cited

U.S. PATENT DOCUMENTS 2,684,635  7/1954  Winkelman et al. ............... 440/900
3,703,642  11/1972  Balaguer .............................. 440/6
3,763,819  10/1973  Mays .................................... 440/3

FOREIGN PATENT DOCUMENTS 2582776  12/1986  France ................................ 440/900

Primary Examiner—Michael S. Huppert
Assistant Examiner—Thomas J. Brahan
Attorney, Agent, or Firm—Leon Gilden

[57] ABSTRACT

A retrofit generator housing is arranged for mounting to an outboard drive housing to regenerate electrical energy into a battery of the associated outboard motor, with the generator housing arranged for fixed mounting to an end wall of the drive housing of the outboard motor in a coaxially aligned relationship.

4 Claims, 4 Drawing Sheets

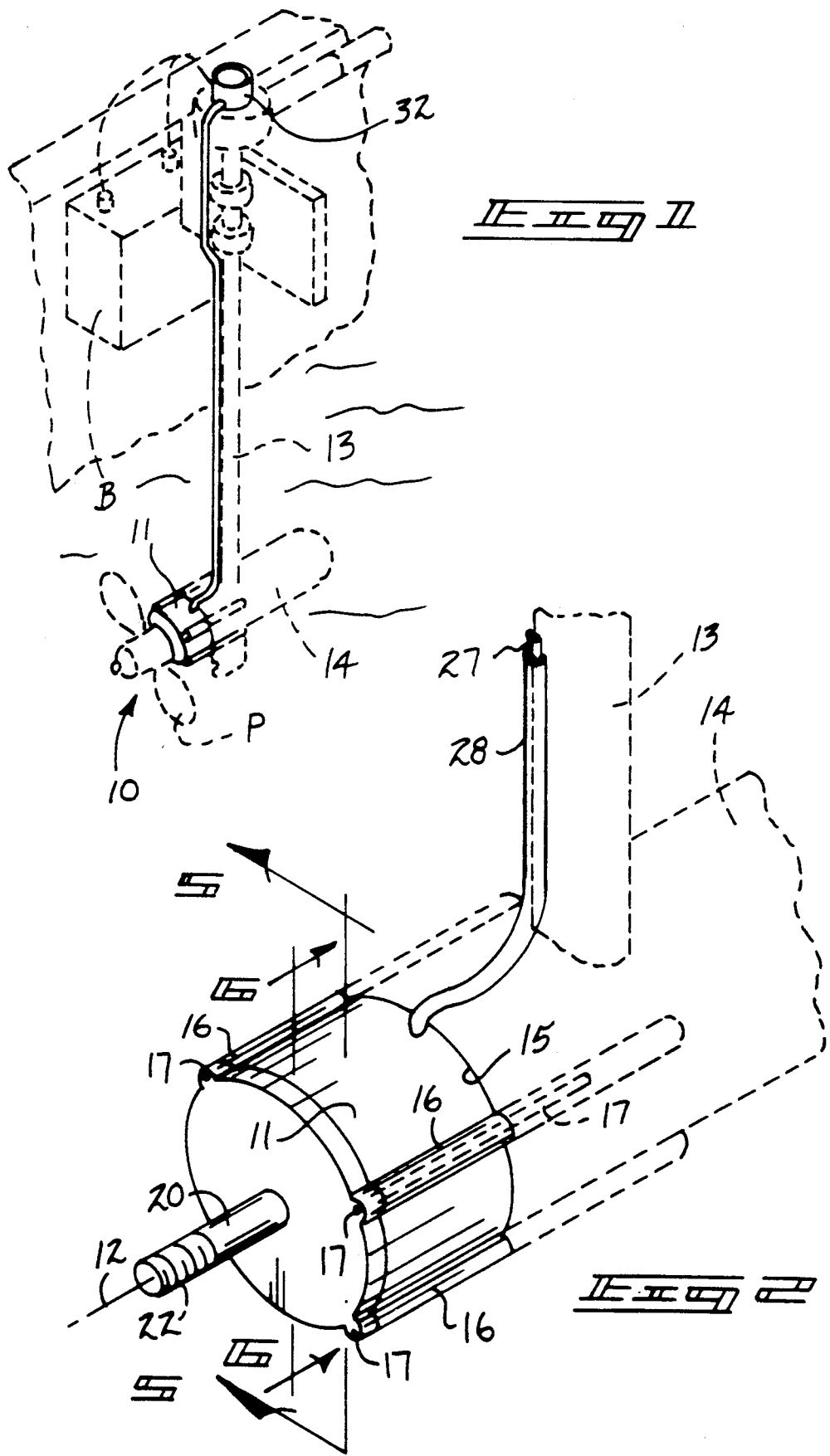

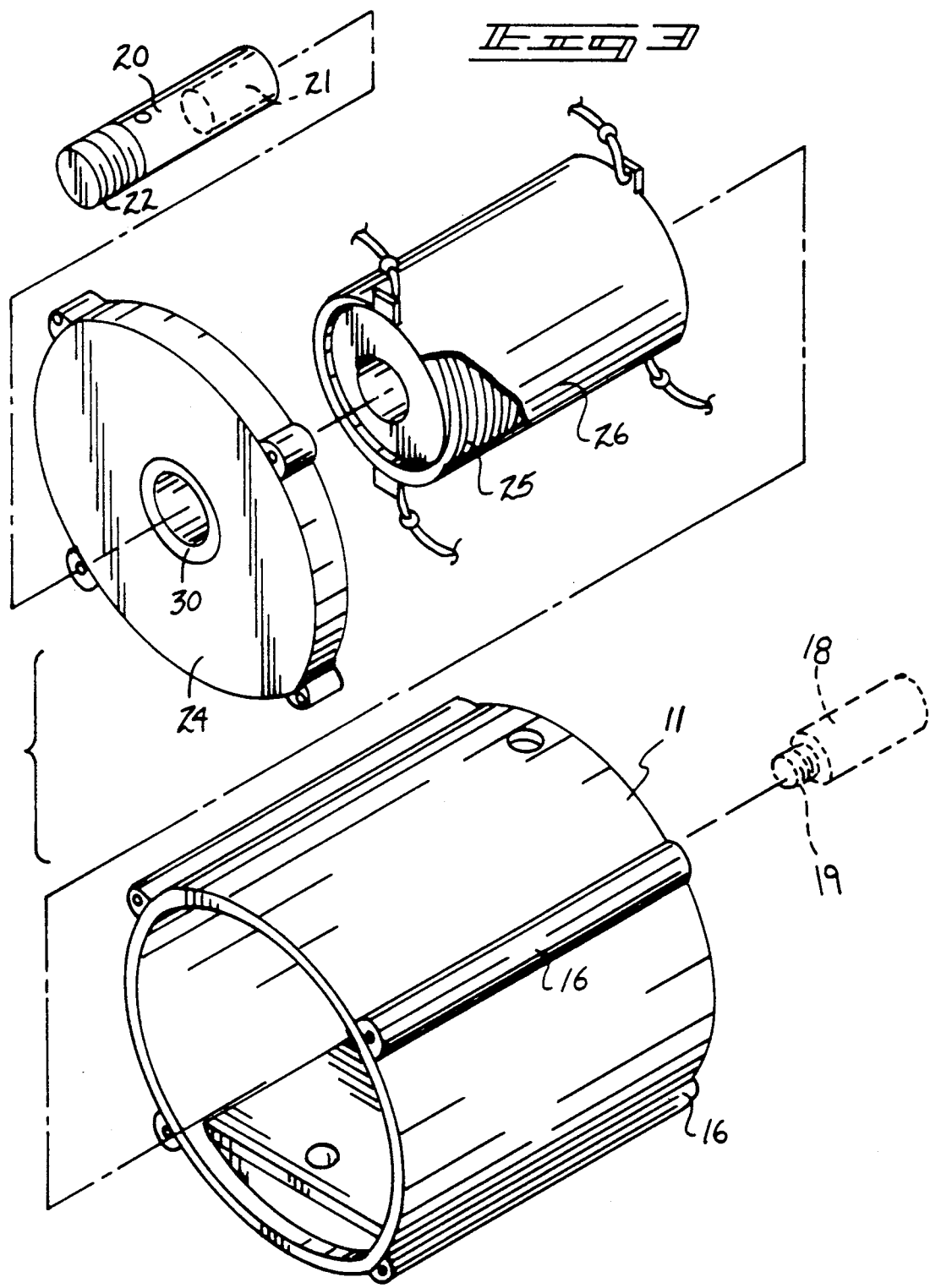

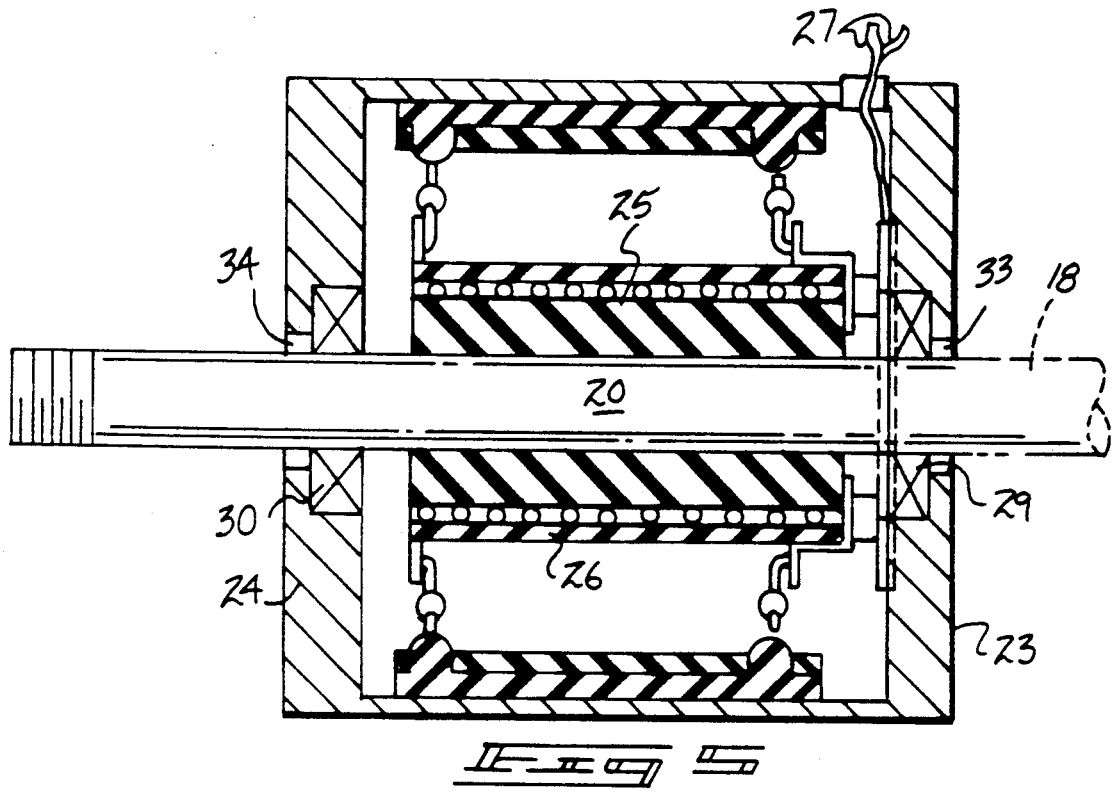
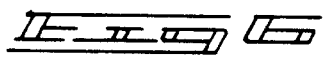
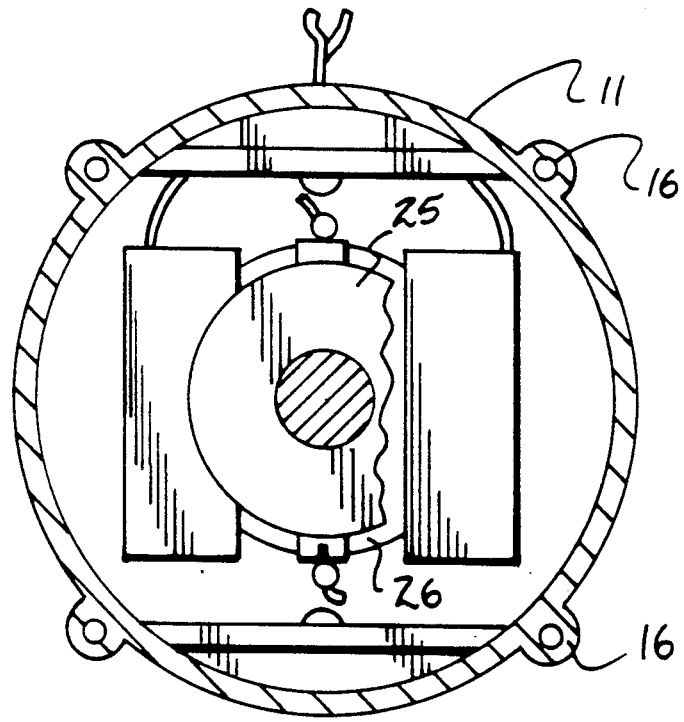

OUTBOARD MOTOR RETROFIT GENERATOR APPARATUS

BACKGROUND OF THE INVENTION

1. Field of the Invention

The field of invention relates to outboard motor apparatus, and more particularly pertains to a new and improved outboard motor retrofit generator apparatus wherein the same is arranged for mounting to an outboard motor drive housing.

2. Description of the Prior Art

Outboard motors, and particularly electrical outboard motors, typically consume electrical energy, wherein the instant invention attempts to redirect such electrical energy permitting the replenishment of battery power permitting prolonged usage of the outboard motor and in this respect, the present invention substantially fulfills this need.

SUMMARY OF THE INVENTION

In view of the foregoing disadvantages inherent in the known types of outboard motor apparatus now present in the prior art, the present invention provides an outboard motor retrofit generator apparatus wherein the same is arranged to redirect electrical energy into a storage battery of an outboard motor. As such, the general purpose of the present invention, which will be described subsequently in greater detail, is to provide a new and improved outboard motor retrofit generator apparatus which has all the advantages of the prior art outboard motor apparatus and none of the disadvantages.

To attain this, the present invention provides a retrofit generator housing arranged for mounting to an outboard drive housing to regenerate electrical energy into a battery of the associated outboard motor, with the generator housing arranged for fixed mounting to an end wall of the drive housing of the outboard motor in a coaxially aligned relationship.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved outboard motor retrofit generator apparatus which has all the advantages of the prior art outboard motor apparatus and none of the disadvantages.

It is another object of the present invention to provide a new and improved outboard motor retrofit generator apparatus which may be easily and efficiently manufactured and marketed.

It is a further object of the present invention to provide a new and improved outboard motor retrofit generator apparatus which is of a durable and reliable construction.

An even further object of the present invention is to provide a new and improved outboard motor retrofit generator apparatus which is susceptible of a low cost of manufacture with regard to both materials and labor, and which accordingly is then susceptible of low prices of sale to the consuming public, thereby making such outboard motor retrofit generator apparatus economically available to the buying public.

Still yet another object of the present invention is to provide a new and improved outboard motor retrofit generator apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the invention.

FIG. 2 is an enlarged isometric illustration of the generator housing arranged for coaxially aligned mounting to the outboard motor drive housing.

FIG. 3 is an isometric exploded view of the generator housing structure.

FIG. 5 is an orthographic cross-sectional illustration of the generator housing, taken along the lines 5—5 of FIG. 2 in the direction indicated by the arrows.

FIG. 6 is an orthographic view, taken along the lines 6—6 of FIG. 2 in the direction indicated by the arrows.

DESCRIPTION OF THE PREFERRED EMBODIMENT

Figure 4:
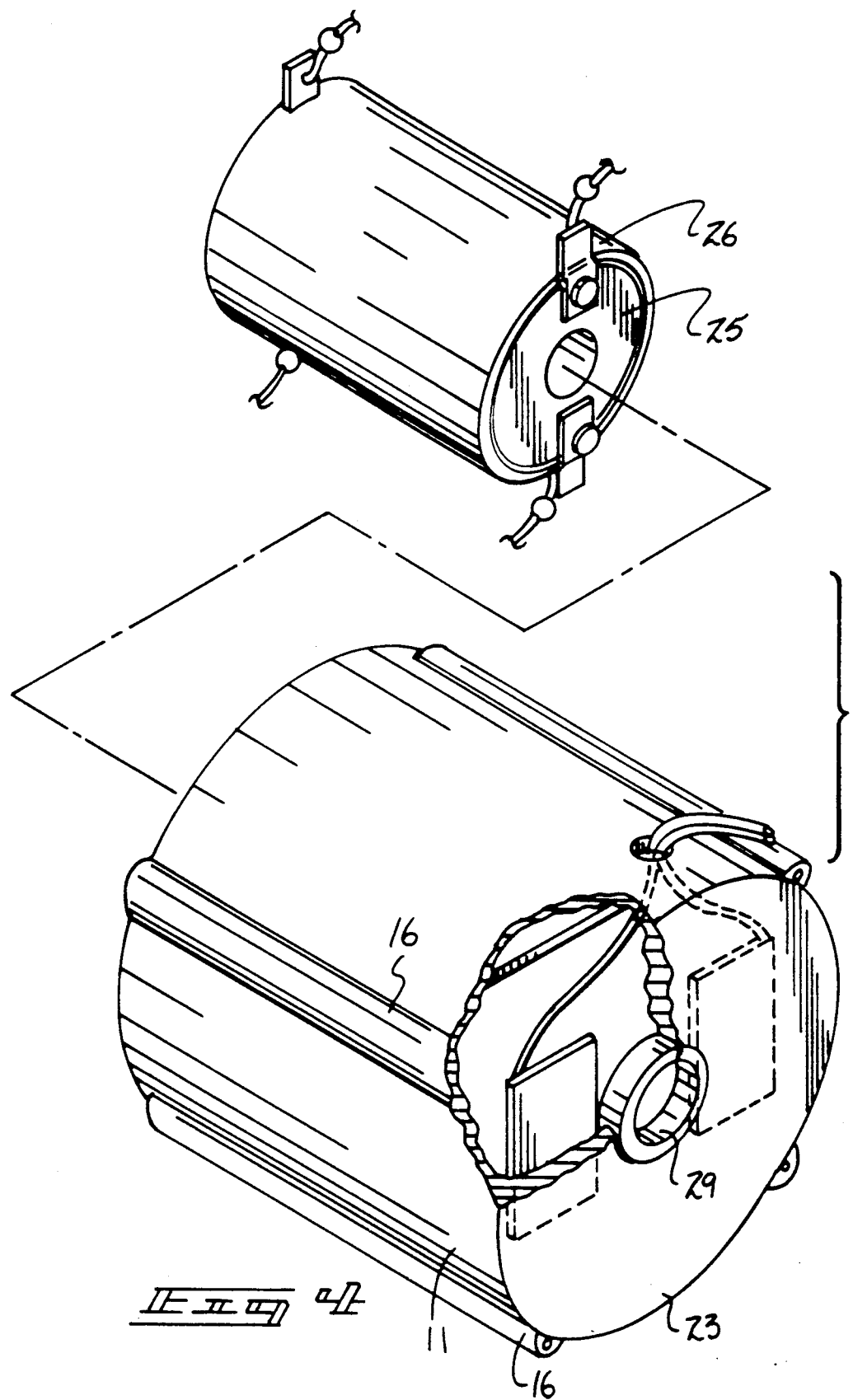
FIG. 4 is an isometric illustration of the generator housing receiving the armature therewithin.

With reference now to the drawings, and in particular to FIGS. 1 to 6 thereof, a new and improved outboard motor retrofit generator apparatus embodying the principles and concepts of the present invention and generally designated by the reference numeral 10 will be described.

More specifically, the outboard motor retrofit generator apparatus 10 of the instant invention essentially comprises a rigid generator housing 11 coaxially oriented symmetrically about a housing axis 12 that is mounted to an outboard motor, and more specifically to the outboard motor drive housing 14, with the outboard motor support housing 13 directed from the drive housing and mounted to a boat in a conventional manner. The generator includes a plurality of generator housing tubular ribs 16 directed in an annular array about the exterior surface of the generator housing 11. Each of the tubular ribs 16 receiving a fastener 17 directed therethrough, with the fastener received within a drive housing receiving bore, in a manner as indicated in FIG. 2. The outboard motor includes an outboard motor output shaft 18 (see FIG. 3), with the outboard motor output shaft 18 having an output shaft threaded distal end 19. An extension shaft 20 is provided, with the outboard motor output shaft threaded distal end 19 received within the extension shaft first end 21 configured as an internally threaded socket. The extension shaft second end is externally threaded to receive the propeller "P", as illustrated in FIG. 1. The generator housing 11 includes a housing first end plate 23 spaced from a second end plate 24. An armature 25 relative to a stator 26 are coaxially oriented within the generator housing 11, whereupon rotation of the extension shaft 20 mounting the armature 25 thereto, electricity is directed from the generator structure through output lines 27 mounted within a flexible shield conduit 28, having its first end directed into in sealed communication with the generator housing 11 and the second end of the shield conduit 28 directed along the outboard motor support housing 13, wherein the output lines 27 are directed to the battery "B" through a voltage regulating device 32.

As illustrated in FIG. 5 for example, the output motor output shaft 18 is received through the generator housing first end plate 23, and more specifically rotatably mounted within a first bearing 29 sealingly engaged by a first seal 33. A second bearing 30 coaxially aligned with the first bearing 29 is directed through the second end plate 24 rotatably receiving the extension shaft 20, with a second seal 34 oriented between an exterior surface of the second end plate 24 and the second bearing 30 to sealingly in a fluid-type manner secure the contents within the generator housing 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An outboard motor retrofit generator apparatus arranged for mounting in combination with an outboard motor, wherein the outboard motor includes a support housing and a drive housing, the drive housing including an output shaft coaxially oriented relative to the drive housing, and the apparatus further comprises a generator housing, the generator housing symmetrically oriented relative to said axis, wherein the generator housing includes a generator housing first end plate orthogonally oriented relative to said axis, and the generator housing including a generator housing second end plate spaced from and parallel the generator housing first end plate, with the output shaft directed into the first end plate, and a generator means mounted within the generator housing, wherein the generator means includes an extension shaft, the extension shaft in mounted relationship relative to the output shaft, wherein the extension shaft is rotatably directed through the second end plate for receiving a propeller thereon.

2. An apparatus as set forth in claim 1 wherein the first end plate includes a first bearing, the second end plate includes a second bearing, the first bearing and the second bearing are coaxially aligned relative to one another and said axis, and the drive housing includes a drive housing end wall, wherein the first end plate is arranged for contiguous communication with the drive housing end wall, and the generator housing includes a plurality of tubular ribs arranged in an annular array symmetrically about said axis, and each of the ribs includes a fastener directed therethrough, each fastener is received within said drive housing for securing the generator housing to the drive housing.

3. An apparatus as set forth in claim 2 wherein the output shaft includes an output shaft threaded distal end, the extension shaft includes an extension shaft internally threaded socket first end, wherein the output shaft threaded distal end is received within the internally threaded socket first end, and the internally threaded socket first end is positioned within the generator housing receiving the output shaft threaded distal end.

4. An apparatus as set forth in claim 3 wherein the generator means includes output lines and a shield conduit receiving the output lines, wherein the shield conduit includes a first end in sealing engagement with the generator housing and the output lines directed through the shield conduit, the shield conduit includes a second end, and the second end is arranged in sealing communication to a voltage regulating device, and the voltage regulating device is mounted to the support housing directing electrical energy from the voltage regulating device to an associated battery relative to the outboard motor.

* * * * *